Dec. 11, 1928.　　　　　　　　　　　　　　　　　　1,694,732
L. A. COHEN
TRUCK FOR TRANSPORTING POULTRY
Filed March 12, 1926　　　　4 Sheets-Sheet 1
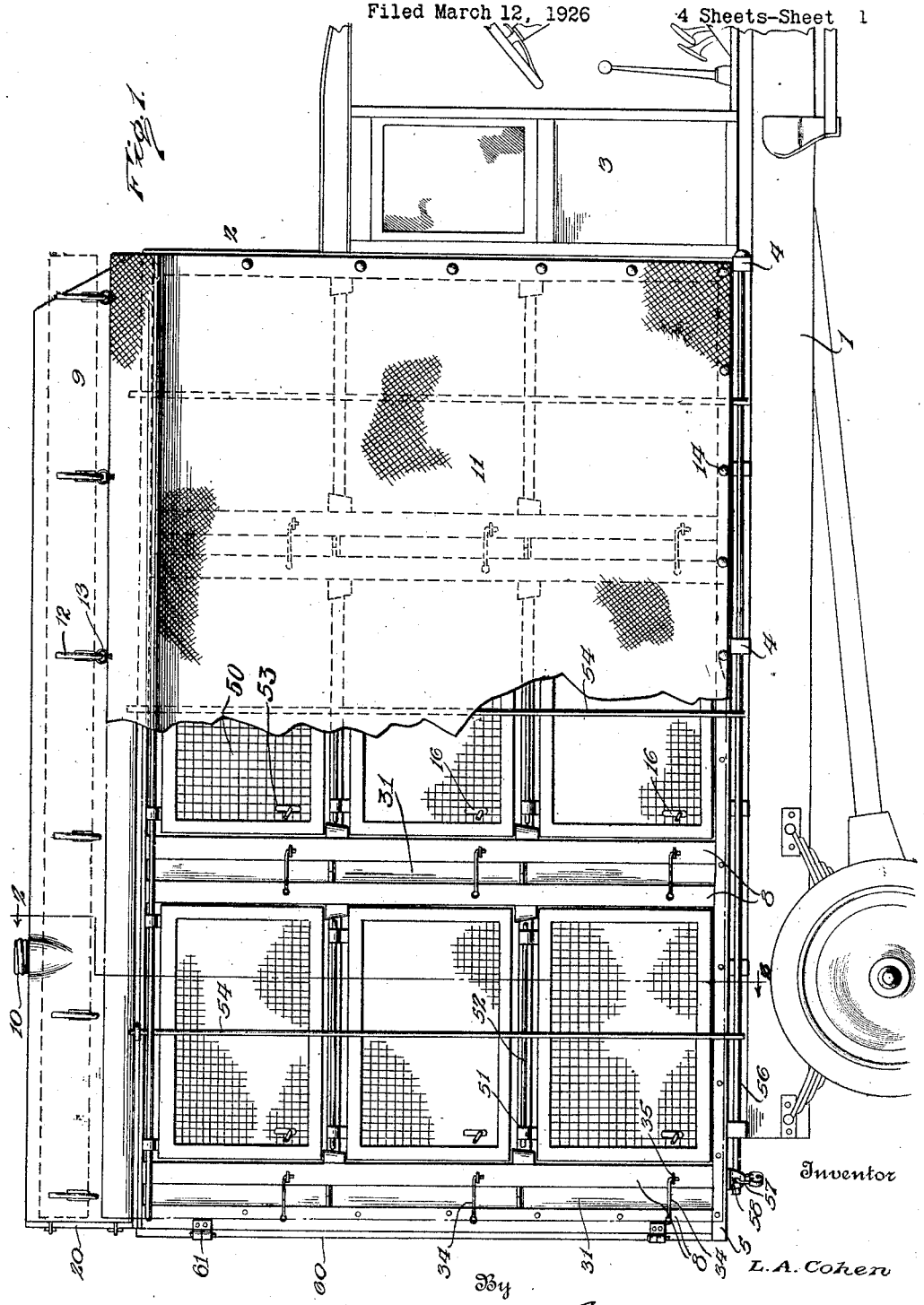
Inventor
L. A. Cohen
By Lacey & Lacey, Attorneys

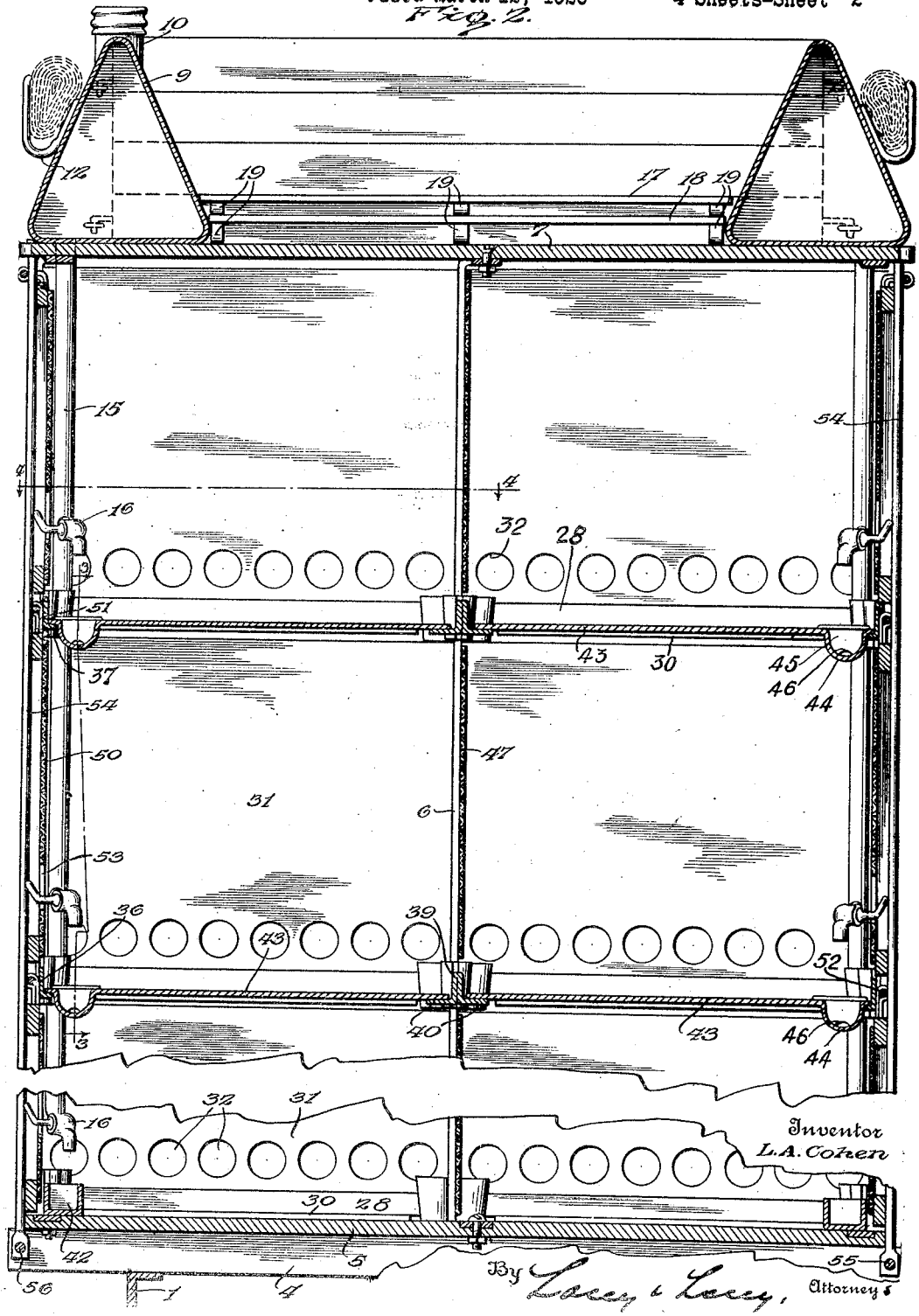

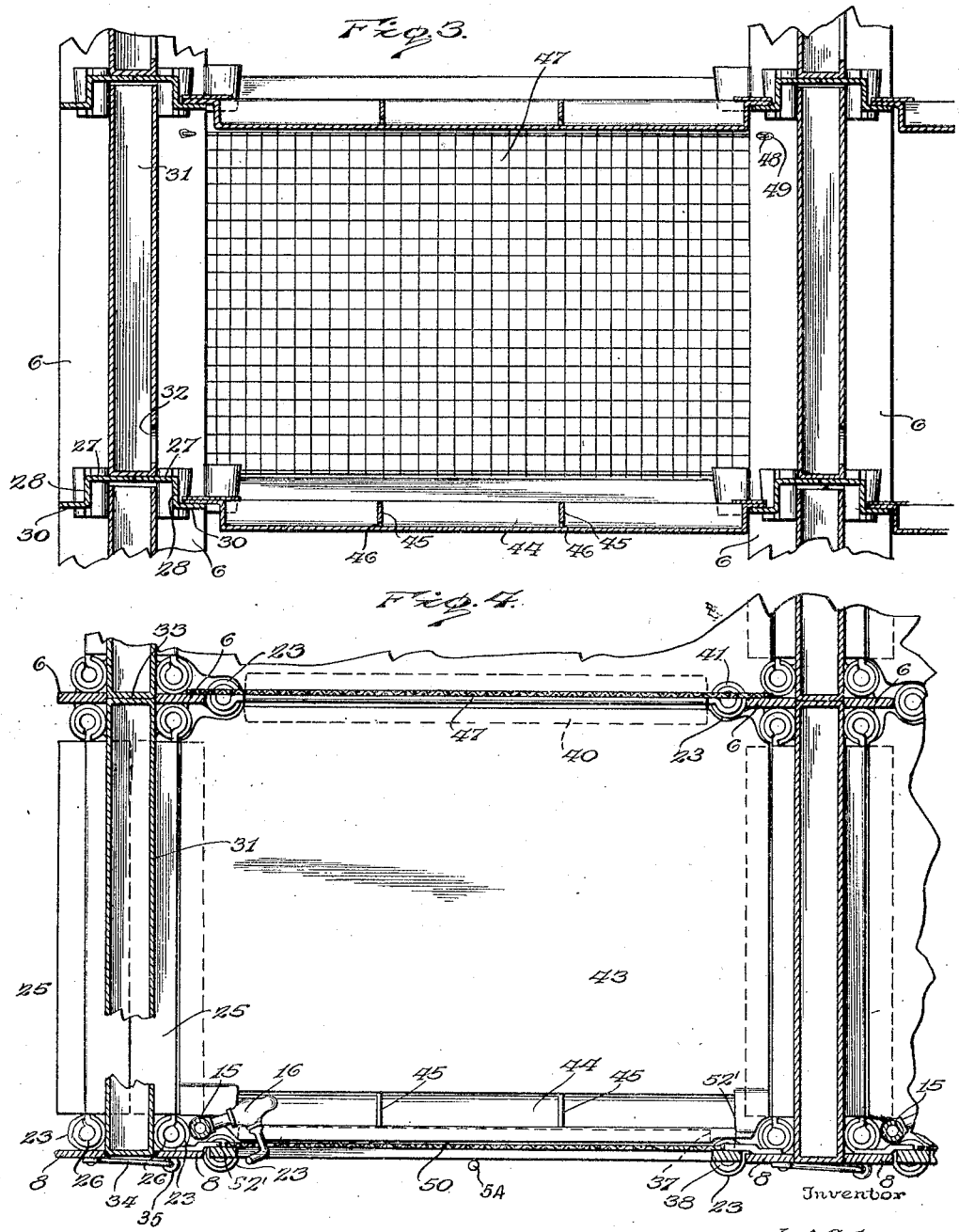

Dec. 11, 1928.
L. A. COHEN
1,694,732
TRUCK FOR TRANSPORTING POULTRY
Filed March 12, 1926     4 Sheets-Sheet 4
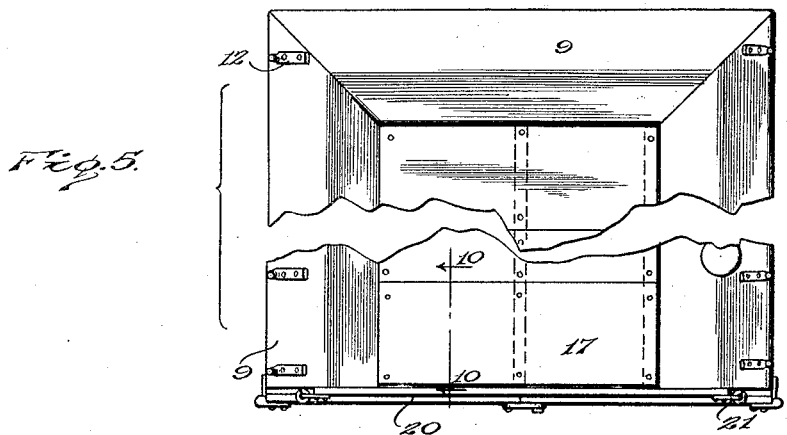
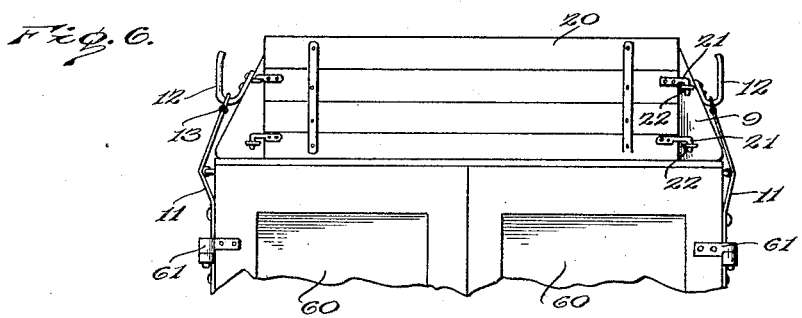
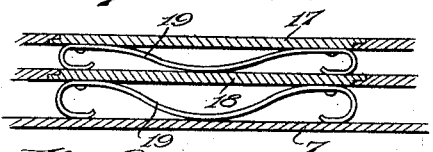
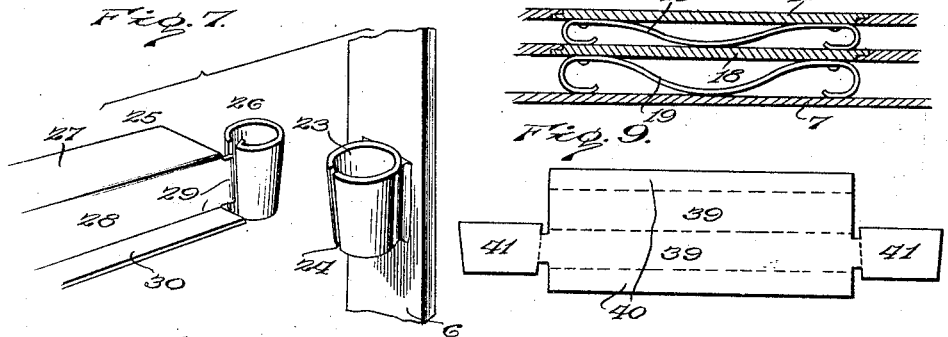
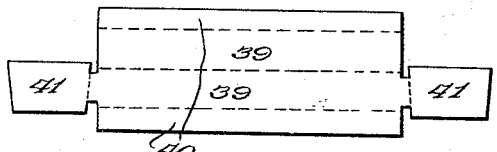
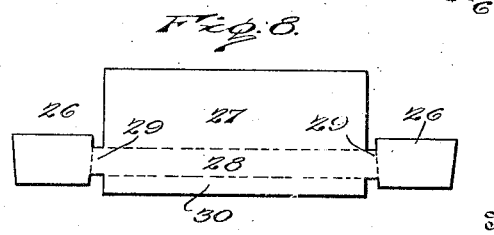
Inventor
L. A. Cohen
By Lacey & Lacey, Attorneys Patented Dec. 11, 1928.

1,694,732

UNITED STATES PATENT OFFICE.

LOUIS A. COHEN, OF CENTRAL CITY, KENTUCKY.

TRUCK FOR TRANSPORTING POULTRY.

Application filed March 12, 1926. Serial No. 94,257.

This invention relates to means for transporting poultry and is especially applicable to a motor truck for carrying poultry and eggs to a shipping or trading point. One object of the invention is to provide means whereby eggs may be transported at the same time poultry is shipped without liability to breakage, and another object of the invention is to provide means whereby the fowls will be supplied with food and water during transportation. Another object of the invention is to provide a structure which will permit the interior of the truck or van to be cleared so that upon a return trip other forms of merchandise may be carried. Other incidental objects of the invention will appear as the description proceeds, and the invention resides in certain novel features which will be particularly pointed out in the appended claims.

In the accompanying drawings, which illustrate one embodiment of the invention,

Figure 1 is a side elevation of a motor truck having the invention applied thereto, the side curtain being partly broken away;

Fig. 2 is an enlarged transverse section on the line 2—2 of Fig. 1;

Fig. 3 is an enlarged detail longitudinal section on the line 3—3 of Fig. 2;

Fig. 4 is a horizontal section on the line 4—4 of Fig. 2;

Fig. 5 is a detail top plan view of a portion of the truck;

Fig. 6 is a detail rear elevation of the upper portion of the truck;

Fig. 7 is a detail showing the manner in which some of the parts are supported within the truck;

Figs. 8 and 9 are detail plan views of blanks from which some of the supporting elements are formed;

Fig. 10 is an enlarged detail section on the line 10—10 of Fig. 5.

My invention relates particularly to the construction of the vehicle body, and the chassis or truck frame 1 may be of any known or approved form, the body 2 constituting my present invention being set upon the chassis immediately in rear of the cab 3, as shown in Fig. 1 and as will be readily understood.

In carrying out my invention, I set upon the chassis 1 cross bars or sills 4 which may be secured in position in any convenient manner, and upon these cross bars or sills I secure a fixed bottom or floor 5. To said floor 5 at intervals I secure the lower ends of rods or bars 6 which constitute a series extending along the longitudinal medial line of the floor and are secured at their upper ends to a roof 7. I also provide side bars or uprights 8 which are arranged in pairs at intervals in the length of the floor and are also secured at their upper ends to the roof so that the roof will be firmly supported. Across the front of the roof and along the sides of the same I provide a tank 9 which is equipped with a filling nipple 10 so that water may be supplied thereto in an obvious manner. The particular shape of the tank is immaterial but it is preferably of the triangular form shown in Fig. 2 in cross section whereby wind resistance is minimized and the sides of the tank may be utilized as supports for the side curtains 11 in fair weather. To carry the side curtains upon the tank, hook-shaped brackets 12 are secured upon the sides of the tank at intervals in the length thereof and the curtain 11 is provided along its upper edge with rings or eyes 13 adapted to engage over the hooks so that they may be suspended therefrom close to the sides of the body 2 to protect the fowls against inclement weather. Button or snap fasteners 14 are provided along the edges of the curtains so that they may be fastened to the uprights 8 and to the lower frame or floor 5 to be held close to the body in a well-known manner. When the weather is warm and ventilation through the body is desirable, the edges of the curtains are released from the side frames and the curtains are then rolled so that they may be engaged between the outer portions of the hooks and the sides of the tank, as indicated by the dotted lines in Fig. 2, to be carried in an out of the way manner. Outlet pipes 15 extend downwardly from the tank so as to supply water to the several coops or compartments of the truck body and upon these pipes are mounted faucets or similar discharge controlling means 16 which may be adjusted to permit the water to discharge very slowly so that an adequate supply for the fowls will be maintained but overflow and waste is not apt to occur.

It will be noted at once that the tank defines a space in which articles may be placed and will be held by the tank from rolling over the sides of the truck body. This space I utilize primarily for the shipping of eggs in boxes or other containers and to guard against breakage I provide the yieldable floors or platforms 17 and 18 which may be constructed in sections, as indicated most clearly in Figs. 5 and 10, and each of which rests upon a plurality of springs 19, the said springs being preferably bowed leaf springs having their terminals and their intermediate portions disposed to rest freely upon the roof of the truck body or upon the lower floor, as the case may be, while immediately adjacent the bowed terminals the end portions of the springs are secured to the under sides of the respective floors. To prevent the boxes or other containers sliding off the rear end of the floor 17, I provide the gate or guard 20 which is connected with and held by the tank ends through the medium of hooks 21 secured upon the guard or gate and engageable in eyes 22 on the tank, as shown clearly in Fig. 6.

The upright supporting bars or frame bars 6 and 8 are arranged in pairs as has been stated and as shown in Figs. 1, 3 and 4. Upon each of these bars are provided supporting lugs or holders which are arranged in such number and in such spaced relation as may be needed to accommodate any desired number of crates or poultry-carrying compartments. In the present illustration, I have shown three columns on each side of the vehicle with three tiers in each column. The supporting lugs or holders, as shown most clearly in Fig. 7, each comprises a downwardly tapered sleeve 23 which is open at both its upper and its lower ends and is provided with a vertical space or gap 24 at a proper point to be engaged by a tongue upon the supported member. The sleeve 23 is circular in section and is secured to the supporting frame bar by brazing or otherwise as may be most convenient. As will be understood upon reference to Figs. 2 and 4, the holders 23 are provided on the inner sides of the frame bars 8 and also upon both sides of the frame bars 6. Disposed between each outer frame bar and the transversely alined intermediate frame bar is a shelf or support 25 which is provided at each end with a locking lug 26 similar in form to the supporting lug or sleeve 23 so that by inserting the shelf through the outer side of the body, while slightly elevated above the floor or the proper supporting sleeves, until the locking lugs 26 are alined vertically with the respective sleeves, the shelves or supports may be moved downwardly so that the lugs 26 will ride into engagement with the sleeves and thereby support the shelves in their proper places and hold them against displacement. As shown in Fig. 7, each shelf 25 comprises an upper horizontal tread member 27, a riser member 28 at each end of which is a tongue 29 integrally connecting the riser with the locking lug 26, and, at the lower end of the riser 28, a base or foot 30 which is adapted to rest upon the floor 5 or extend inwardly to provide a support for members which will be presently identified. In Fig. 8, I have shown a plan view of a sheet metal blank from which the shelf 25 may be produced, it being readily seen that the blank may be stamped from a piece of sheet material at one operation and then, in a suitable bending machine, may be folded into the proper form, the locking lug being produced by rolling the end extensions upon themselves in an obvious manner. As shown most clearly in Figs. 3 and 4, the shelves or supporting members are also employed in pairs, the free edges of the tread members 27 meeting midway between the planes of the frame bars 6 and 8 so that they form a continuous flush surface upon which a feed box 31 may be supported. This feed box may be made of any inexpensive material and filled before being inserted in the truck and to put the feed box in place it is necessary merely to slide it endwise between the frame bars so that it will rest upon the shelves 25 and bridge the joint between the tread members 27 thereof. The feed boxes are each provided in one wall with openings 32 so that the fowls may have ready access to the feed. After the boxes have been put in place, the inner vertical ends of the transversely alined boxes will abut at the center of the truck, as shown at 33 in Fig. 4, and inward movement of the boxes will be thereby prevented. To prevent outward movement and consequent loss of the boxes, I provide a plurality of latches 34 which are pivoted on one of the frame bars 8 and are adapted to engage suitable hasps or keepers 35 on the adjacent frame bar, as will be understood upon reference to Figs. 1 and 4. The supporting members or shelves 25 are provided at intervals transversely of the truck and the feed boxes are so arranged that each feed box will supply one compartment. Holding sleeves 23 are provided on the edges of the frame bars 6 and 8, except at the outer vertical edges of the foremost and rearmost frame bars, and carried by these last-mentioned holding sleeves 23 are supporting plates which, at the sides of the structure, are L-shaped bars having vertical webs or flanges 36 and horizontal lips or flanges 37 at the lower edges of the said webs 36 and projecting inwardly therefrom, the said supporting plates being provided at each end with a locking lug 38 engageable in the corresponding holding sleeve 23 in the manner previously described. At the medial longitudinal line of the truck, the supporting plates are in the form of an inverted T consisting of a folded or doubled upstanding web or rib 39, from the lower edges of which flanges 40 project in opposite directions, these supporting plates being provided at their ends with locking lugs 41 corresponding in all respects to the locking lugs 26 previously described and engageable in the corresponding sleeves 23 as before set forth. In Fig. 9, I have illustrated a blank from which the supporting plates 39 and 40 may be produced in an obvious manner and it will be noted that this blank is very similar to the blank shown in Fig. 8 to produce the supporting member or shelf 25. These lips or flanges 30, 37 and 40 are intended to support the floors of upper chambers but are not necessary in the lowermost chamber for the reason that the floor 5 of the vehicle body is utilized as the floor of the lowermost compartments. At the outer side of the lowermost compartment in each column is provided a trough 42 which is disposed under the lowermost faucet or water-regulating device 16 and rests directly upon the floor 5. To prevent displacement of this trough, however, during travel of the vehicle over rough roads, it is provided at its ends with locking lugs similar to the locking lugs 26 and engageable in holding sleeves 23 at the lower edges of the frame bars 8. The floors 43 of the upper compartments are provided with integral troughs 44 along their outer edges, and these floors are removably carried by the lips 30, 37 and 40, as shown in Figs. 2, 3 and 4. To place the floors 43 in position, they are inserted through the open outer sides of the respective compartments while held elevated sufficiently to clear the several holding sleeves upon the frame bars. They are also preferably slightly canted or tilted so that they will avoid damaging contact with the water pipes or the feed boxes. After the water pipes have been cleared, the floor may be turned to a horizontal position and caused to rest upon the supporting lips or flanges 37 and 40, as will be understood. The several watering troughs are all provided with transverse spaced partitions 45 so that the splashing of water due to the vibration of the traveling vehicle will be minimized and these partitions are provided with openings 46 through their lower edges to permit the water to flow from end to end of the trough.

Along the center of the vehicle, I provide reticulated partitions 47 which may be of any well-known general form and are supported in place by engaging hooks 48 provided at their ends through openings 49 provided therefor in the respectively adjacent frame bars 6. These partitions are obviously removable so that repairs or cleaning may be easily accomplished and also to permit the entire interior of the body to be cleared when merchandise other than poultry is to be transported. The several floors 43 are likewise easily removable for the same purpose and, of course, the intermediate supporting shelves or plates 39 may be easily removed so that, when poultry is not to be transported, the entire interior of the body becomes available to hold other articles.

The outer side of each compartment is closed by a screen or reticulated door 50 which is supported at its upper end by hinges 51 engaged with hinge bars 52 provided upon the outer sides of the respective strips 36 and adapted to hang by gravity against the stop lugs 52' secured upon the respectively adjacent frame bars 8, as shown in Fig. 4. These doors are each provided with an opening 53 so as to accommodate the handle of the faucet 16 and permit the flow of water to be shut off or otherwise regulated from the exterior of the vehicle. To hold the doors in closed position, locking rods 54 are secured at their upper ends in the roof 7 and depend therefrom at the outer side of each column of doors, the lower end of each locking rod being provided with an opening 55 therethrough through which is engaged a rod 56 secured at its front end in the foremost cross bar 4 and provided at or adjacent its rear end with a suitable opening to receive the hasp of a lock 57 whereby it may be secured to a lug or bracket 58 on the floor or other fixed part of the device. The poultry are, of course, placed in the several compartments and the outer doors 50 then lowered to closed position. The several vertical locking rods 54 on each side of the track are then brought into proper position, the rods 56 inserted through the lower ends of said rods 54 and the locks 57 fastened, all the doors being thus secured.

From the foregoing description, taken in connection with the accompanying drawings, it will be seen that I have provided a very simple and inexpensive structure whereby a motor truck may be utilized to carry poultry and eggs to a market or shipping point and then the several elements whereby the poultry containing chambers or compartments are defined may be easily separated and placed within the truck body or upon the top of the same within the space defined by the tank to permit the interior of the body to be utilized for transportation or other merchandise. While the feed boxes will constitute rear walls for the several poultry containing chambers or compartments, it is desirable to provide some other form of closure for the rear end of the body when poultry is not to be transported and to that end I provide the doors 60 which are removably hinged, as shown at 61, to the rearmost frame bars 8 and are so disposed as to meet at the center of the rear end of the truck. These doors may be easily hung when merchandise other than poultry is to be transported and may be just as easily removed and stored when poultry is to be transported.

Having thus described the invention, I claim:

1. A vehicle for transporting poultry and the like comprising a supporting frame, spaced uprights secured upon said frame along the sides and transverse center thereof, transverse and longitudinal shelves detachably engaged with the uprights to be supported thereby, feed boxes resting upon the transverse shelves and forming partitions between adjoining compartments, floors supported at their edges by the several shelves and means on the uprights for preventing release of the feed boxes.

2. A vehicle for transporting poultry and the like comprising a supporting frame including vertical frame bars, downwardly tapered split sleeves carried by said frame bars at intervals in their height, shelves provided at their ends with locking lugs adapted to engage within and be supported by the said sleeves, floors resting upon said shelves, partitions detachably connected to some of the frame bars over some of the shelves, feed boxes disposed over other shelves and carried thereby at the ends of said partitions, and doors mounted at the outer ends of the said feed boxes.

3. A truck for transporting poultry and the like comprising a supporting frame, means detachably mounted on the frame for defining and constituting series of poultry receiving compartments, doors provided at the outer ends of the several compartments and hinged at their upper edges, locking bars secured to the supporting frame and extending vertically across each column of doors, locking rods engaged through the lower ends of said locking bars and each secured at one end to the frame and provided at its opposite end with means for locking it against displacement.

4. A vehicle for transporting poultry and the like comprising upright frame bars arranged in compartment-defining relation, shelves detachably mounted on said frame bars, feed boxes resting on the shelves and slidable between vertically successive shelves whereby to constitute partitions between adjoining compartments, and means on the frame bars to retain the feed boxes on the shelves.

5. A vehicle for transporting poultry and the like comprising upright frame bars arranged in compartment-defining relation, shelves detachably mounted on the frame bars and including tread portions abutting at their inner edges and base portions projecting laterally with respect to the tread portions, floors resting at their edges on the base portions of the shelves, feed boxes resting on the tread portions of adjacent shelves and constituting partitions between adjacent compartments, and means on the frame bars to restrain the feed boxes.

In testimony whereof I affix my signature.

LOUIS A. COHEN.